US007273285B2

(12) United States Patent
Yen et al.

(10) Patent No.: US 7,273,285 B2
(45) Date of Patent: Sep. 25, 2007

(54) METHOD FOR MANAGING LAMP BRIGHTNESS

(75) Inventors: Chien-Wu Yen, Miao-Li County (TW); Tzu-Hai Chung, Miao-Li County (TW); Tung-Lung Lai, Miao-Li County (TW)

(73) Assignee: Coretronics Corporation, Miao-Li County (TW)

( * ) Notice: Subject to any disclaimer, the term of this patent is extended or adjusted under 35 U.S.C. 154(b) by 233 days.

(21) Appl. No.: 10/711,669

(22) Filed: Sep. 30, 2004

(65) Prior Publication Data

US 2006/0066256 A1 Mar. 30, 2006

(51) Int. Cl.
*G03B 21/14* (2006.01)

(52) U.S. Cl. .......................... 353/85; 353/121; 349/61

(58) Field of Classification Search ................ 353/121, 353/122, 85; 349/61, 68; 348/798; *G03B 21/42*
See application file for complete search history.

(56) References Cited

U.S. PATENT DOCUMENTS

| | | | | |
|---|---|---|---|---|
| 5,616,988 | A * | 4/1997 | Kim | 315/1 |
| 6,734,641 | B2 * | 5/2004 | Shoji et al. | 315/291 |
| 2003/0218602 | A1 * | 11/2003 | Naito | 345/204 |
| 2004/0239887 | A1 * | 12/2004 | Yasuda | 353/57 |
| 2006/0001840 | A1 * | 1/2006 | Kurihara | 353/85 |

* cited by examiner

*Primary Examiner*—Andrew T. Sever
(74) *Attorney, Agent, or Firm*—Jianq Chyun IP Office

(57) ABSTRACT

A method for managing bulb brightness, which is suitable for use in a displaying apparatus based on lamp, is proposed. The characteristics of the method include switching the lamp to the standard mode with maximum brightness in the displaying state, and switching the lamp to the ECO mode with reduced brightness in the other states. Therefore, this method is more adaptive than the prior art, making the apparatus to be more convenient in use, and optimizing the use of the lamp in presenting higher picture quality, and prolonging the lifetime of lamp.

8 Claims, 3 Drawing Sheets

METHOD FOR MANAGING LAMP BRIGHTNESS

BACKGROUND OF THE INVENTION

1. Field of Invention

The present invention relates to a method for managing lamp brightness. More particularly, the present invention relates to method for managing lamp brightness in a displaying apparatus, which uses the lamp to produce the image.

2. Description of Related Art

Currently, many displaying apparatuses are based on the light beam emitted from the lamp, so as to produce a image. The projector is one of the examples. The operation for this kind of displaying apparatus usually includes several states, as shown in FIG. 1.

In the operation states shown in FIG. 1, when the display signal exists, the operation state then stays at a displaying state 103 for displaying a normal image. When the displaying apparatus is in searching for display signal, it then enters a searching state 102. When the display signal does not exist, the displaying apparatus enters a no-signal state 101. When the user temporarily closes the image, the displaying apparatus enters the video mute state 104.

In this kind of displaying apparatus, the lamp is the consumable part in high price. For example, the lamp used in the projector has the retail price that is as high as about 20%-30% of the whole projector itself. In this consideration, a method to reduce the lamp brightness is proposed, so as to prolong the lifetime of the lamp. In the current conventional methods, the lamp can be set to be the standard mode or the ecologic protection (ECO) mode. Wherein, the brightness for the standard mode is 100%, but the brightness for the ECO mode is 80%. When the lamp is set to the ECO mode, then the lower brightness is used to have longer lifetime.

The issue is that the current method is not flexible, and cannot automatically switch the lamp mode. When the lamp is set to the standard mode, no matter which state in FIG. 1, the brightness for the lamp is always 100%. Actually, except the displaying state 103, the image in display for all the other states is not so important, and it is not necessary to have the 100% brightness. Likewise, when the lamp is set to the ECO mode, no matter which state, the brightness for the lamp is always 80%. In this manner, even though the lifetime of the lamp can be prolonged, the user has to endure the poor image quality due to the reduction of brightness when the normal image is displayed in the displaying state 103.

Therefore, it needs to have more flexible method to solve the issue in the art, and also keep the image quality and lamp lifetime.

SUMMARY OF THE INVENTION

One of the objects of the invention is to provide a method for managing lamp brightness, so as to solve the problems in prior art. The method can be automatically switch the lamp mode, so as to have convenient use, but also can optimize the use of the lamp, so as to consider both the image quality and the lamp lifetime.

To at least achieve the above and other objects, the invention provides a method for managing lamp brightness, which is suitable for use in a displaying apparatus based on the manner to produce the image by the lamps. The method mainly includes setting a selection item corresponding to a mode of a first mode and a second mode. Wherein, a brightness for the lamp at the first mode is different from a brightness at the second mode. And then, a specific signal is searched. If the specific signal exists and the foregoing selection item corresponds to the first mode, then the lamp is set to the first mode. If the specific signal exists and the foregoing selection item corresponds to the second mode, then the lamp is set to the second mode. If the specific signal does not exist, then the lamp is set to the second mode.

In the foregoing method for managing lamp brightness in an embodiment, the specific signal is a display signal.

In the foregoing method for managing lamp brightness in an embodiment, the brightness for the lamp at the second mode is lower than the brightness at the first mode.

In the foregoing method for managing lamp brightness in an embodiment, the brightness for the lamp at the second mode is about 80% of the brightness at the first mode.

From the other point of view, the invention further provides a method for managing lamp brightness, which is suitable for use in a displaying apparatus based on the manner to produce the image by the lamps. The method includes searching a specific signal. If the specific signal does exist, then the lamp is set to a first mode. If the specific signal does not exist, then the lamp is set to a second mode. Wherein, the brightness for the lamp at the first mode is different from the brightness at the second mode.

In the foregoing method for managing lamp brightness in an embodiment, the specific signal is a display signal.

In the foregoing method for managing lamp brightness in an embodiment, the brightness for the lamp at the second mode is lower than the brightness at the first mode.

In the foregoing method for managing lamp brightness in an embodiment, the brightness for the lamp at the second mode is about 80% of the brightness at the first mode.

According to the embodiments of the invention, when the foregoing method for managing lamp brightness is applied on a displaying state, the lamp is automatically switched to the standard mode, and display at the substantial maximum brightness. When it is at the other states, the lamp is automatically switched to the ECO mode, and display at the relatively lower brightness. Therefore, the invention can flexibly solve the issues in prior art. As a result, the use is more convenient and the use of the lamp can be used optimized with consideration of both image quality and lamp lifetime.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

The invention can be used in displaying apparatus by a projector that uses the lamp to produce an image display. An embodiment as the example is presented to describe the method for managing the lamp brightness in the invention as follows.

Figure 1:
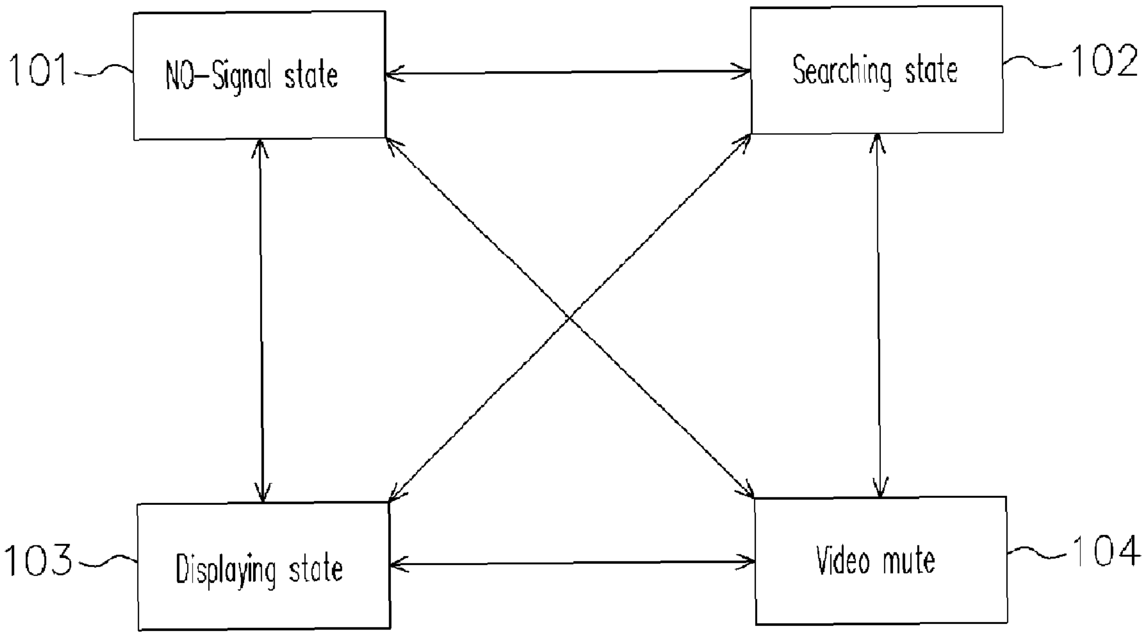
FIG. 1 (PRIOR ART)
FIG. 1 is a drawing, schematically illustrating the states of the conventional displaying apparatus.
Figure 2A:
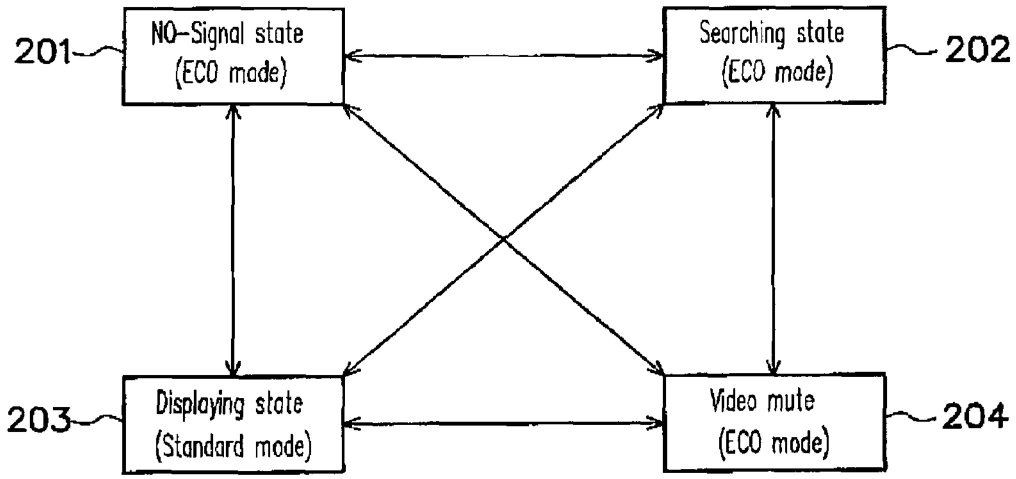
FIG. 2A and FIG. 2B are drawings, schematically illustrating the states of the conventional displaying apparatus by the method for managing lamp brightness, according to an embodiment of the invention.
Figure 2B:
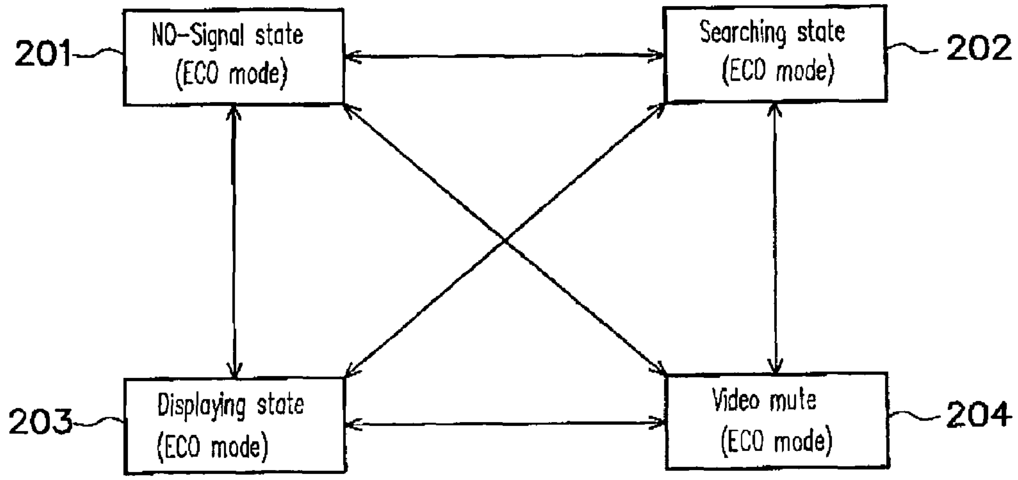

In the embodiment, a use can set a presetting mode of the lamp as a standard mode or an ECO mode via the functional selection items provided by, for example, on-screen display (OSD). If the standard is preset, the situation is shown in FIG. 2A. Under the displaying state 203, the lamp is automatically set to the standard mode with maximum 100% brightness to display the best image quality. When the display signal is not there, it is then under the no-signal state 201, the searching state 202 or the video mute state 204. The lamp is automatically set to the ECO mode, so as to display under a lower brightness, such as 80% brightness, and thereby to prolong the lifetime of lamp. In this manner, both the lifetime of lamp and the image quality desired by the user can be taken into consideration. On the other hand, if the ECO mode is preset, the situation is shown in FIG. 2B. Under the four states, the lamp is set to the ECO mode to display with low brightness for prolonging the lifetime.

Figure 3:
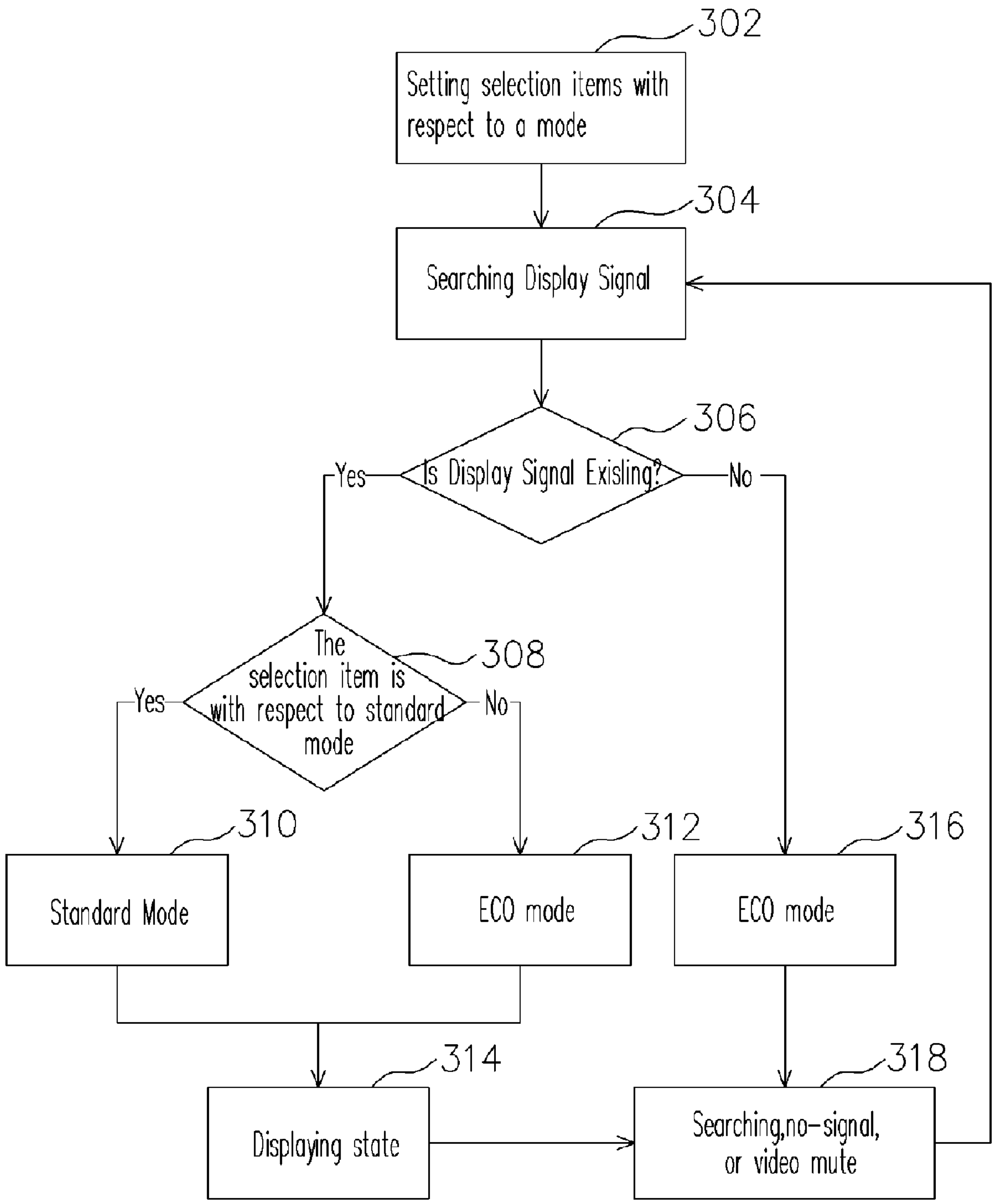
FIG. 3 is a flow diagram, schematically illustrating the process of the method for managing lamp brightness, according to an embodiment of the invention.

FIG. 3 is the process flow diagram. First in step 302, the user sets the selection items corresponding to a mode that is the preset mode of the lamp. Then, the displaying apparatus searches the display signal in step 304. In step 306, it is judged whether or not the display signal does exist. If the display signal exists, then the displaying apparatus, in step 308, checks whether or not the selection item is corresponding to the present mode. If the preset mode is the standard mode, then the displaying apparatus in step 310 sets the lamp to the standard mode. Otherwise, the displaying apparatus in step 312 sets the lamp to the ECO mode. After the lamp is set, the displaying apparatus proceeds to step 314 and enters the displaying state for normally display the image.

If the judgment form the step 306 indicates that the display signal does not exist, then the displaying apparatus at step 316 sets the lamp to the ECO state. At step 318, the displaying apparatus then enters the searching state, the no-signal state, or the video mute state according to the actual operation. On the other hand, after the displaying apparatus enters the displaying in step 314, if it occurs about some situations, such as signal being disappear, signal line being disconnected by user, or image being temporarily closed and so on, then the displaying apparatus also enters the step 318 to the searching state, the no-signal state, or the video mute state according to the actual operation. After then, the displaying apparatus returns to the step 304 for searching the display signal.

In the embodiment, the user can set the preset mode for the lamp via the selection item. For another embodiment in a more simplified arrangement, it has no the above selection item, and the lamp is preset to the standard mode. In this simplified embodiment, the states of the displaying apparatus are as shown in FIG. 2A but not the states in FIG. 2B. In other words, when the displaying signal does exist, then the displaying apparatus sets the lamp to the standard mode, and then enter the displaying state. If the displaying signal does not exist, the displaying apparatus then sets the lamp to the ECO mode. And then, it enters the searching state, the no-signal state, or the video mute state according to the actual operation. For the ordinary skilled artisans, it can be understood to simplify the previous embodiment into this embodiment in the actual operation procedures, and then the descriptions are omitted.

According to foregoing descriptions, the method for managing the lamp brightness in the invention can automatically switch the lamp to the standard mode when it is at displaying state, so as to display in higher brightness, and the lamp is automatically switched to the ECO mode when it is at other states, so as to display in lower brightness. Therefore, the issues in prior art can be solved by a flexible way. As a result, it has more convenient use and the lamp cam be used in an optimizing manner, wherein both the quality of image and the lamp lifetime are taken into consideration.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for managing a lamp brightness, suitable for use in a displaying apparatus using a lamp to produce an image, the method comprising:

presetting a selection item corresponding to a predetermined mode from a first mode and a second mode, wherein a brightness of the lamp at the first mode is different from the brightness at the second mode;

searching a display signal, wherein the displaying apparatus is at one of a displaying state, a searching state, a no-signal state, and a video mute state, wherein the display signal exists when the displaying apparatus is at the displaying state;

setting the lamp to the first mode when the display signal exists and when the predetermined mode is the first mode, and automatically setting the lamp from the first mode to the second mode when the display signal does not exist; and setting the lamp to the second mode when the display signal exists and when the predetermined mode is the second mode, and maintaining the lamp to the second mode when the display signal does not exist.

2. The method of claim 1, wherein the displaying apparatus is at one of the searching state, the no-signal state, and the video mute state when the display signal does not exist.

3. The method of claim 1, wherein the brightness of the lamp at the second mode is lower than the brightness at the first mode.

4. The method of claim 3, wherein the brightness of the lamp at the second mode is 80% of the brightness at the first mode.

5. A method for managing a lamp brightness, suitable for use in a displaying apparatus using a lamp to produce an image, the method comprising:

searching a display signal, wherein the displaying apparatus is at one of a displaying state, a searching state, a no-signal state, and a video mute state, wherein the display signal exists when the displaying apparatus is at the displaying state;

determining the state of the displaying apparatus; and setting the lamp to a first mode when the display signal does exist, automatically setting the lamp from the first mode to a second mode when the display signal does not exist, wherein the brightness of the lamp at the first mode is different from the brightness at the second mode.

6. The method of claim 5, wherein the displaying apparatus is at one of the searching state, the no-signal state, and the video mute state when the display signal does not exist.

7. The method of claim 5, wherein the brightness of the lamp at the second mode is lower than the brightness at the first mode.

8. The method of claim 7, wherein the brightness of the lamp at the second mode is 80% of the brightness at the first mode.

* * * * *

UNITED STATES PATENT AND TRADEMARK OFFICE

CERTIFICATE OF CORRECTION

PATENT NO. : 7,273,285 B2
APPLICATION NO. : 10/711669
DATED : September 25, 2007
INVENTOR(S) : Chien-Wu Yen et al.

It is certified that error appears in the above-identified patent and that said Letters Patent is hereby corrected as shown below:

On the Title page of the patent grant, please replace item (73) Assignee's Name with -- Coretronic Corporation --

Signed and Sealed this

Twenty-first Day of October, 2008

Jon W. Dudas

JON W. DUDAS
*Director of the United States Patent and Trademark Office*